J. F. SMART.
HANDLE.
APPLICATION FILED AUG. 30, 1919.
1,422,630.
Patented July 11, 1922.
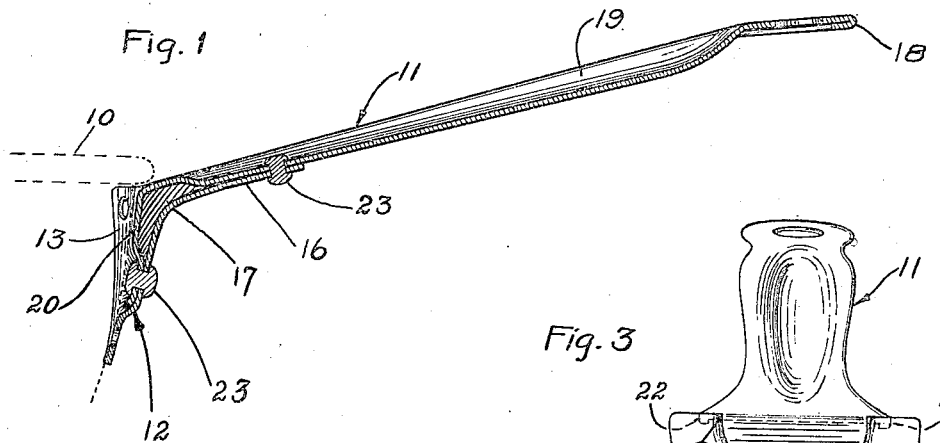
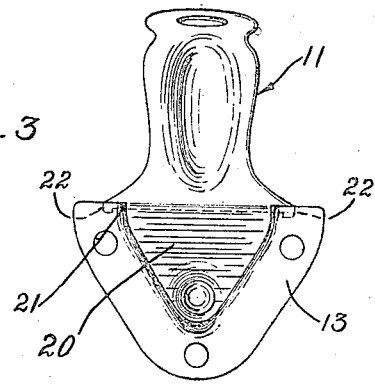
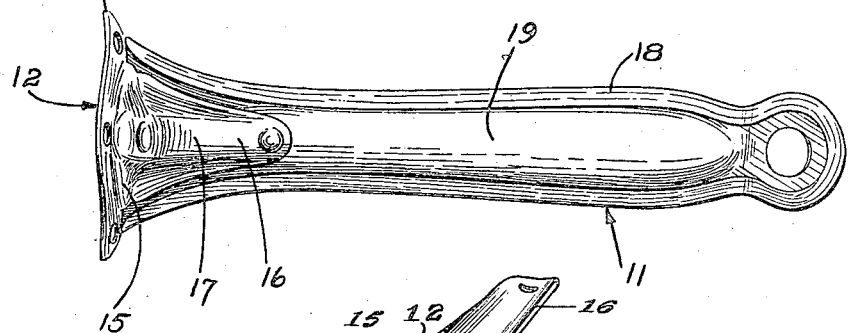
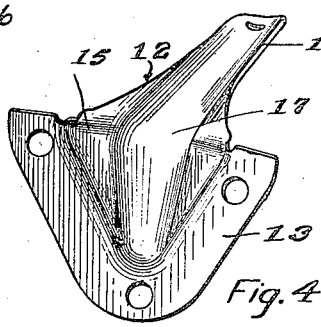
INVENTOR.
Joseph Frederick Smart
BY
*Hubbart*
his ATTORNEY.

UNITED STATES PATENT OFFICE.

JOSEPH FREDERICK SMART, OF NEW BRITAIN, CONNECTICUT, ASSIGNOR TO LANDERS, FRARY & CLARK, OF NEW BRITAIN, CONNECTICUT, A CORPORATION OF CONNECTICUT.

HANDLE.

1,422,630.   Specification of Letters Patent.   Patented July 11, 1922.

Application filed August 30, 1919. Serial No. 320,767.

*To all whom it may concern:*

Be it known that I, JOSEPH FREDERICK SMART, a citizen of the United States, residing at New Britain, in the county of Hartford, State of Connecticut, have invented certain new and useful Improvements in a Handle, of which the following is a specification.

This invention relates to handles for utensils and the like and has as its object to provide a handle having features of novelty and advantage which result in simplicity, strength and neatness.

In the accompanying drawings:

Fig. 1 is a longitudinal sectional view through the handle, the same being shown attached to a utensil.

Fig. 2 is a view from below of my improved handle, and

Fig. 3 is an end view thereof.

Fig. 4 is a perspective view of one part of my improved handle.

Referring to the drawings, 10 designates a utensil of any suitable kind, the specific construction thereof forming no part of the present invention. My improved handle comprises a handle portion 11 and a member 12 for attaching the handle portion to the utensil.

The attaching member 12 comprises a plate preferably formed of sheet metal pressed into shape and having a flange 13 fitting flatwise against the side of the utensil and secured thereto in any suitable manner, such as by means of rivets. The attaching member has a boss 15 which extends to the upper edge of the plate and from this boss and at an angle thereto extends a tang 16. The boss extends outwardly, that is to say, it is spaced from the plane of the flange 13, and, therefore, from the utensil to which the handle is secured. The boss and tang are curved transversely along a longitudinal central line so as to provide an arch or reinforcing web 17.

The handle portion 11 is preferably formed by stamping out from a sheet of metal a blank of suitable configuration and then rolling over its edges so as to form a bead 18 which provides a smooth edge and also strengthens the handle. The handle between its ends is curved transversely along a longitudinal central line as at 19. At the forward end of the handle is a depending tang 20 adapted to fit within the recess formed by the boss 15. It will be seen from the drawings that the ends of the flange 13 extend slightly above the level of the tang 16 and the handle adjacent its tang 20 has shoulders 22 which abut against the upstanding ends of the flange 13 giving a neat and pleasing appearance.

In the present illustrative disclosure of my invention, I have shown the tang 20 of the handle 11 as being secured to the boss and the tang 16 of the attaching member 12 secured to the transversely curved portion 19 by means of rivets 23, but it is to be understood that other suitable securing means may be employed and, if desired, the parts may be electrically welded together.

It will be noted from the foregoing description that my improved handle comprises but two parts, each of which may be stamped and formed from sheet metal. The structure is materially strengthened by the bead 18 and the transversely curved portion 19 of the handle portion and also by the arch or web 17 which functions in the nature of a brace or strut. The handle may be attached to a utensil of any kind, but it is particularly applicable for use on utensils made of aluminum and when so applied the handle is preferably formed of aluminum.

It is evident that my invention is susceptible of various modifications and changes which are within the spirit of the invention without departing from the scope of the following claims.

I claim as my invention:—

1. A handle comprising an attaching member provided with a body portion having a flange adapted to engage against and be secured to a utensil, an outwardly extending boss located inside of said flange, and a tang extending outwardly from said boss; and a handle portion overlying and secured to said tang and also having a tang fitting within the recess provided by said boss and secured to said boss.

2. A handle comprising an attaching member provided with a body portion having a flange adapted to engage against and be secured to a utensil, a boss located inside of said flange, and a tang extending outwardly from the upper edge of said boss; a handle portion in overlying engagement with said tang and also having a tang fitting within the recess provided by said boss, means for securing the tang of said handle portion to said boss, and means for securing the handle portion to said tang of said attaching member.

3. A handle comprising an attaching member provided with a body portion adapted to abut against a utensil and having a recess on its inner face and a tang extending outwardly at an angle to said body portion, said attaching member at the juncture of said body portion and tang thereof being transversely curved to provide an arched reinforcing web; and a handle portion in overlying engagement with and secured to said tang and also having a tang fitting within said recess and secured to the wall thereof.

4. A handle comprising, an attaching member provided with a flange, a boss open at one end and terminating short of the ends of said flange, and a tang extending outwardly from said boss, said tang and boss being curved transversely along their longitudinal centers; and a handle portion secured to said tang and having at one end a substantially flat depending tang fitting within and secured to said boss, said handle adjacent its tang being positioned between the ends of said flanges and having lateral shoulders overlying said flanges.

5. A handle comprising an attaching member having a body portion adapted to abut against a utensil and a tang extending outwardly at an angle thereto, and a handle portion secured to said tang and having a tang secured to the inner face of said body portion of said attaching member, and means for securing said body portion to a utensil.

JOSEPH FREDERICK SMART.